April 19, 1927.

G. F. FISHER

MANUFACTURE OF CUSHION TIRES

Filed Feb. 17, 1922

1,625,644

2 Sheets-Sheet 1

Inventor
GEORGE F. FISHER
By his Attorney
Ernest Hopkinson

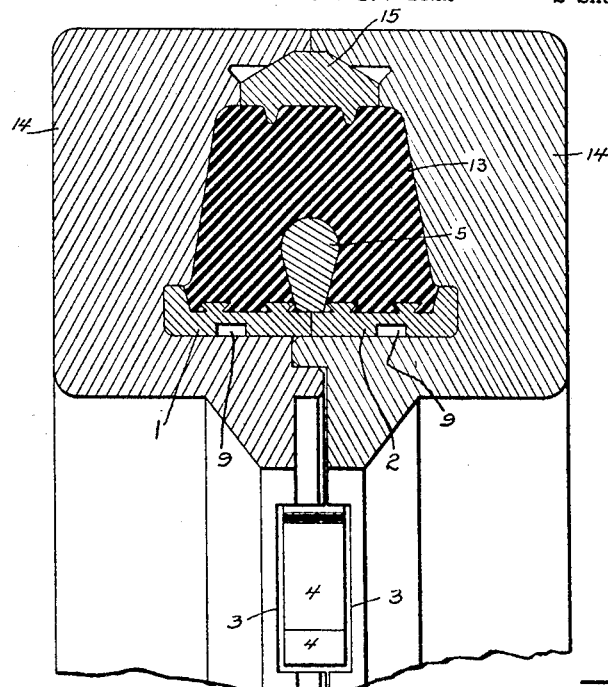
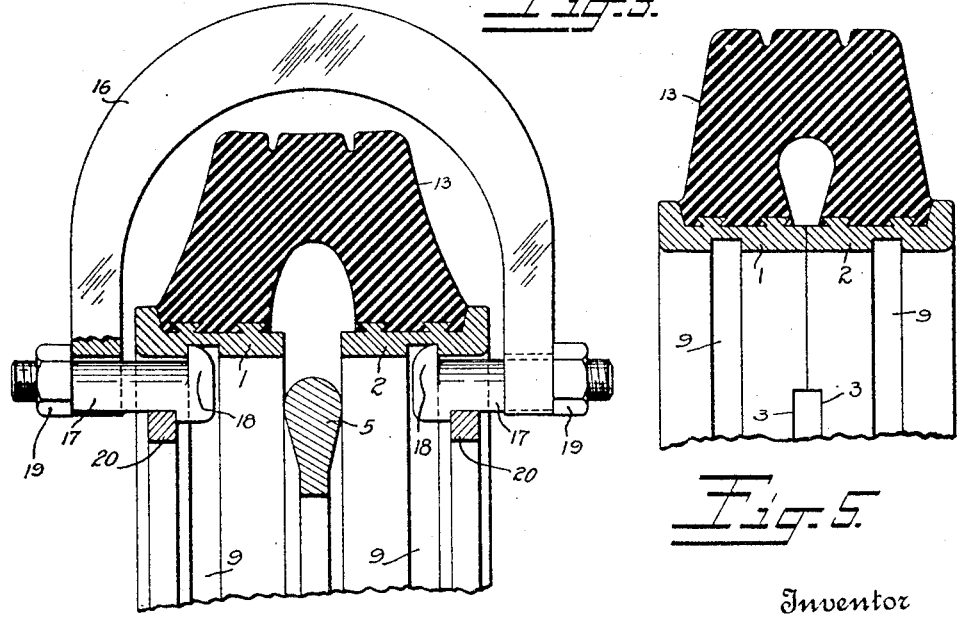

Patented Apr. 19, 1927.

1,625,644

UNITED STATES PATENT OFFICE.

GEORGE F. FISHER, OF ROSELLE, NEW JERSEY, ASSIGNOR, BY MESNE ASSIGNMENTS, TO MORGAN & WRIGHT, OF DETROIT, MICHIGAN, A CORPORATION OF MICHIGAN.

MANUFACTURE OF CUSHION TIRES.

Application filed February 17, 1922. Serial No. 537,159.

This invention relates to the manufacture of solid tires of a cushioning type provided with an internal channel, or other cavity formation, which is designed to augment the yielding or cushioning properties of the tire in service by permitting its rubber body greater freedom of displacement under load.

The invention aims to facilitate and cheapen the cost of manufacturing such cushion types of solids and to produce a better tire; one which is cured to the metallic base in the relation and shape to be used and in contact therewith almost the entire width of the base, thereby to insure a durable and permanent bonding or union of the rubber body with the metallic base, and one whose metallic base is divided into the fewest parts, consistent with the attainment of the above ends, and also is provided with a minimum of notches or slots for the lugs of cores that during vulcanization shape the internal channel or cavity in the tire.

With the illustrated embodiment in mind and without limiting intention, the invention briefly consists in curing the tire to a divided metallic base supporting an undercut core for imparting the desired hollow form to the tire, the curing being effected while the parts of the metallic base have their opposed faces in contact, and subsequently separating the divided metallic base to facilitate withdrawal of the segments of the core upon whose removal the inherent resiliency of the cured tire restores the separated parts of the base to the abutting relation they occupied during vulcanization. Then preferably, but not necessarily, the parts of the metallic base are united by spot-welding, or otherwise conveniently making them integral.

A preferred embodiment of the invention is illustrated in the accompanying drawings in which:—

Figure 1:
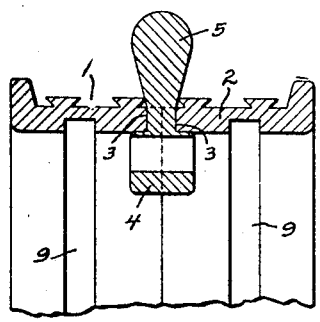
Figure 2:
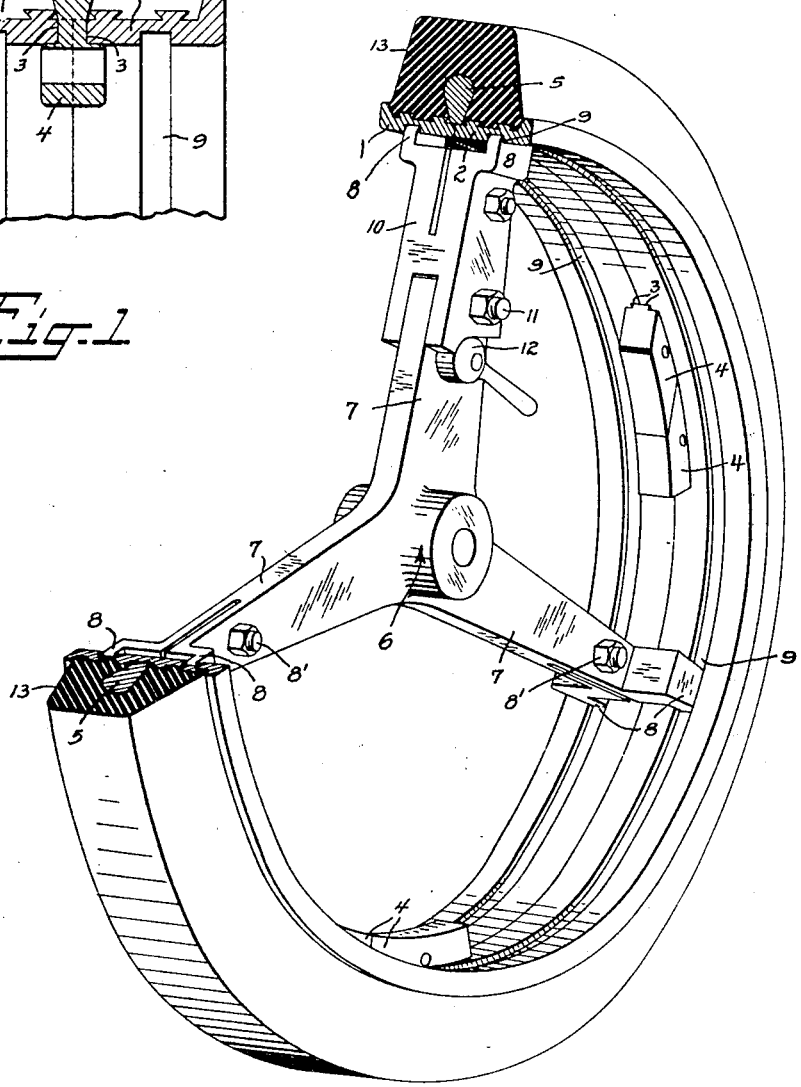

Fig. 1 is a fragmentary section of an assembled two-part metallic base and segmental core supported thereon, Fig. 2 is a perspective, partly in section, of an assembled metallic base and core mounted on a spider and having vulcanizable rubber amassed thereabout, Fig. 3 is a cross-section of the assemblage in a mold, showing the relation of the parts during cure, Fig. 4 is a cross-section illustrating the manner of separating the two parts of the base to facilitate removal of the core, Fig. 5 is a cross-section of the assembled tire, and Fig. 6 is a fragmentary cross-section of a slightly modified metallic base especially suited for spot-welding its parts together.

According to my invention, the metallic base is divided circumferentially into two parts, 1 and 2, whose opposed abutting faces are notched, as indicated at 3, to take or pass inwardly projecting lugs 4 at the opposite ends of the segments, preferably three in number, constituting an annular collapsible core 5. I assemble the collapsible core 5 and metallic base 1—2 in the relation shown in Figs. 1 and 2 upon a spider or chuck indicated generally at 6, having on the ends of two of its arms 7, flexible jaws 8 which are adapted to be received in the grooves 9 of the divided metallic base and to be clamped by the nuts and bolts 8'. The third arm 7 is likewise also equipped with jaws 8, but these are integral with a block 10 which is fulcrumed at 11 for convenience in assemblage, the block 10 being adapted to be locked in position with a cam 12, as shown. The core 5 is preferably of the shape in cross-section illustrated but may be given any suitable form to impart cushioning properties to the tire over and above those inherent in the rubber.

When the core and base-band are assembled and mounted upon the chuck 6, as shown in Fig. 2, a mass of vulcanizable rubber composition 13 may be applied in any suitable manner thereto as by extrusion, or coiling strips from a calender and rolling. Thereafter, the base, core and green tire of vulcanizable rubber are positioned in a sectional mold 14 with a segmental tread ring 15, if it is desired to impart a superficial design to the tread surface of the tire. The annulus of vulcanizable rubber on its divided metallic base and about the collapsible core 5, is subjected to vulcanization while confined in the mold 14 in a press or heater of any suitable type.

After the cure has been completed, the mold is opened and the tire removed, the tire being now vulcanized to its base—it being understood that the practice is to provide a stratum of plastic containing metallic powder and hard rubber between the soft rubber tread and the metallic base to effect a tenacious union or bonding of rubber to metal during vulcanization. The segments of the core 5 are then removed. This may be accomplished by separating the parts 1 and 2 of the metallic base in any suitable and convenient manner. And in the drawings is illustrated a simple suitable apparatus consisting of three or more yokes or spanners 16, each provided with bolts 17, whose hooklike heads 18 are adapted to be drawn upon by nuts 19 to pull apart the sections 1 and 2 of the metallic base into whose grooves 9 the heads 18 have been positioned. Snap rings 20 may be utilized to space and steady the bolts 17. The number of the yokes or spanners 16 employed may be as desired, it being advisable to employ sufficient to permit the application of eight or ten tons pressure which is the approximate amount required to separate the halves of a five inch tire. When the annular portions 1 and 2 of the metallic base have been separated, as shown in Fig. 4, the segments of the collapsible core 5 may be readily withdrawn. Thereafter, the bolts 17 are loosened and the parts of the metallic base allowed to move together under the action of the vulcanized body of the tire.

The product of the above procedure is shown in cross-section in Fig. 5. If desired, the abutting faces of the two parts of the metallic base may be welded or fused together in any convenient manner, but when this is to be done, I preferably locate the grooves 9 in the metallic base parts 1 and 2 close to their abutting faces, as shown in Fig. 6, in order to provide relatively thin walls of metal 20', which will permit spot-welding at any suitable number of points and localized heating without liability of injury to the bond between the rubber of the tire and the metallic base.

From what has been stated above, it will be clear that the tire is formed with an internal annular channel or groove and vulcanized to a divided metallic base whose opposed faces are in contact almost completely around the inner circumference of the finished tire. The rubber body of the tire is consequently cured in the same relation to the metallic base as it occupies subsequently in service on a vehicle. My procedure enables an undercut core to be used to shape the internal channel and thereby is obtained a union or bond of rubber to metal for almost the entire width of the metallic base, an advantage of no inconsiderable value in solid tires. No third annular band or ring is required to space apart, or fill the space between, the sections of the metallic base. And consequently, the tire may be made and molded with its internal channel and vulcanized to the metallic base with a minimum division of the latter consistent with the attainment of ease in manufacture. And by locating the grooves provided in the inner surface of the metallic base adjacent their opposed faces, the two parts of the base may be expeditiously united by a series of spot-welds, rendering the metallic base substantially one-piece.

Having thus described my invention, what I claim and desire to protect by Letters Patent is:

1. That method of shaping solid tires with a centrally disposed annular cavity adjacent the metallic base which consists in, vulcanizing rubber composition to a two-part metallic base whose opposed edges are in contact and around a sectional core supported by the metallic base, and subsequently removing the core and alowing the two parts of the metallic base to assume the normal abutting relation they occupied during vulcanization.

2. That method of shaping solid tires with a centrally disposed annular cavity adjacent the metallic base which consists in, vulcanizing rubber composition to a two-part metallic base whose opposed edges are in contact and around a sectional core supported by the metallic base, subsequently removing the core and restoring the two parts of the metallic base to the abutting relation they occupied during vulcanization, and finally uniting the two parts of the metallic base.

3. That method of making a solid tire with an annular cavity adjacent its base which comprises assembling a sectional core and two-part metallic base with the opposed edges of the latter substantially in contact, amassing vulcanizable rubber composition on the assembled core and base, vulcanizing the composition to the base while confined externally by a mold, separating the parts of the base and removing the sectional core, and finally releasing the parts of the base to permit them to be restored by the vulcanized rubber composition to normal abutting relation.

4. A solid cushion tire having a body of vulcanized rubber composition and a two-part metallic base to which said body is vulcanized, said body being provided with an internal cavity, the parts of the metallic base being normally held with their opposed edges in abutting relation by the body of vulcanized rubber composition.

Signed at New York city, county of New York, State of New York, this 16th day of February, 1922.

GEORGE F. FISHER.